(12) United States Patent
Diehl (10) Patent No.: US 12,124,542 B2
(45) Date of Patent: Oct. 22, 2024

(54) USER-PROTECTED LICENSE

(71) Applicants: Sony Group Corporation, Tokyo (JP); Sony Pictures Entertainment Inc., Culver City, CA (US)

(72) Inventor: Eric Diehl, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 334 days.

(21) Appl. No.: 15/986,641

(22) Filed: May 22, 2018

(65) Prior Publication Data
US 2019/0362054 A1    Nov. 28, 2019

(51) Int. Cl.
*G06F 21/10* (2013.01)
*H04L 9/00* (2022.01)
(Continued)

(52) U.S. Cl.
CPC .......... *G06F 21/105* (2013.01); *G06F 21/10* (2013.01); *H04L 9/008* (2013.01); *H04L 9/0631* (2013.01); *H04L 9/088* (2013.01); *G06Q 2220/18* (2013.01)

(58) Field of Classification Search
CPC .................................................. G06F 21/105
See application file for complete search history.

(56) References Cited

U.S. PATENT DOCUMENTS

| | | | |
|---|---|---|---|
| 6,226,618 B1 * | 5/2001 | Downs | H04L 67/18 705/51 |
| 7,178,033 B1 * | 2/2007 | Garcia | G06F 21/10 713/184 |

(Continued)

FOREIGN PATENT DOCUMENTS

| | | |
|---|---|---|
| CN | 1320232 A | 10/2001 |
| CN | 101002421 A | 7/2007 |

(Continued)

OTHER PUBLICATIONS

Payal V. Parmar, Shraddha B. Padhar, Shafika N. Patel, Niyatee I. Bhatt, Rutvij H. Jhaveri, Survey of Various Homomorphic Encryption algorithms and Schemes, Apr. 2014, International Journal of Computer Applications, vol. 91—No. 8, pp. 3-5 ( Year: 2014).*

(Continued)

*Primary Examiner* — John W Hayes
*Assistant Examiner* — Zehra Raza
(74) *Attorney, Agent, or Firm* — Procopio, Cory, Hargreaves & Savitch LLP (57) ABSTRACT

Distributing and enforcing a license for content to be consumed according to conditions defined by usage rights stated in the license, including: encrypting the usage rights with a key using a homomorphic encryption and sending the encrypted usage rights to an agent; receiving from the agent modified encrypted usage rights generated by performing a homomorphic operation on the encrypted usage rights with a nonce; and decrypting the modified encrypted usage rights and sending the decrypted modified usage rights back to the agent, wherein usage rights are extracted from the decrypted modified usage rights by performing an operation that is reverse of the homomorphic operation with the nonce.

8 Claims, 6 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 10,484,168 B2* | 11/2019 | Ford | H04L 67/104 |
| 2005/0066174 A1 | 3/2005 | Perlman | |
| 2006/0288421 A1* | 12/2006 | Tsai | G06F 21/10 |
| | | | 726/26 |
| 2008/0040618 A1* | 2/2008 | Andersson | H04M 1/72403 |
| | | | 713/193 |
| 2012/0144195 A1 | 6/2012 | Nair | |
| 2013/0060704 A1 | 3/2013 | Read | |
| 2013/0121489 A1 | 5/2013 | Pestoni et al. | |
| 2014/0047557 A1 | 2/2014 | Veerubhotla et al. | |
| 2016/0261404 A1* | 9/2016 | Ford | H04L 67/104 |
| 2016/0381405 A1* | 12/2016 | Smith | G06F 21/10 |
| | | | 725/28 |
| 2017/0206523 A1 | 7/2017 | Goering et al. | |
| 2017/0289111 A1 | 10/2017 | Voell | |
| 2018/0109831 A1 | 4/2018 | Smith | |
| 2018/0115416 A1 | 4/2018 | Diehl | |

FOREIGN PATENT DOCUMENTS

| | | |
|---|---|---|
| CN | 106462689 A | 2/2017 |
| CN | 107660286 A | 2/2018 |
| JP | S63160444 A | 7/1988 |
| JP | 2007124055 A | 5/2007 |
| JP | 2007172593 A | 7/2007 |
| JP | 2007531127 A | 11/2007 |
| WO | WO-2007036862 A2 | 4/2007 |
| WO | 2017127564 A1 | 7/2017 |

OTHER PUBLICATIONS

International Search Report and Written Opinion for related PCT application No. PCT/US2019/033264 mailed Aug. 15, 2019 in 7 pages.

* cited by examiner

USER-PROTECTED LICENSE

BACKGROUND

Field

The present disclosure relates to Digital Rights Management (DRM) licenses, and more specifically, to distributing enforcing the DRM licenses.

Background

The DRM licenses are currently issued by license servers that receive their authorization and usage rights from customer management services or rights lockers. These licenses are bound to a given device or a set of devices. The DRM or the Conditional Access System (CAS) can carry the usage rights associated with a piece of content and a user in a data structure called license or Entitlement Management Message (EMM). This license is protected (and restricted) so that only one given device or a set of identified devices can exploit the data structure. This restriction is performed by encrypting the license uniquely for the targeted device. Thus, the usage rights are bound to the ownership of a given set of hardware devices that hold some secrets. The license is usually generated by a license server.

However, the above-described setup has several drawbacks. For example, with this setup, the user is defined by the devices owned by the user rather than by the user's persona. If the user obtains a new device, the user must register the new device to the license server (or in some cases to a rights locker) which will issue a new set of licenses dedicated to the new device.

To address the drawbacks of the above-described setup, another setup has been proposed in which a blockchain is used to hold all the licenses of a user. One drawback of this setup is that the usage rights are not anonymized. That is, as the blockchain is potentially public, an attacker may discover the titles purchased by the user, either because the usage rights were in the clear, or if encrypted, by looking for similar licenses in known blockchains.

SUMMARY

The present disclosure provides for binding the license to its licensee rather than to the device, while still protecting the license.

In one implementation, a method for distributing and enforcing a license for content to be consumed according to conditions defined by usage rights stated in the license is disclosed. The method includes: encrypting the usage rights with a key using a homomorphic encryption and sending the encrypted usage rights to an agent; receiving from the agent modified encrypted usage rights generated by performing a homomorphic operation on the encrypted usage rights with a nonce; and decrypting the modified encrypted usage rights and sending the decrypted modified usage rights back to the agent, wherein usage rights are extracted from the decrypted modified usage rights by performing an operation that is reverse of the homomorphic operation with the nonce.

In one implementation, the method further includes verifying that the extracted usage rights are same as the usage rights included in the license. In one implementation, the method further includes receiving the content to be consumed according to the usage rights when the verification is made. In one implementation, the content is received by an application installed on a mobile device owned by the user. In one implementation, the key is a secret key that is unique to the user. In one implementation, the key is self-generated by the user. In one implementation, the homomorphic encryption uses Advanced Encryption Standard Counter (AES-CTR) mode and exclusive OR (XOR) as the homomorphic operation.

In another implementation, a method for distributing and enforcing a license for content to be consumed according to conditions defined by usage rights stated in the license is disclosed. The method includes: receiving encrypted usage rights from a user encrypted with a key using a homomorphic encryption; performing a homomorphic operation on the encrypted usage rights with a nonce to generate and send modified encrypted usage rights to the user; receiving from the user decrypted modified usage rights which were decrypted using the key; and extracting usage rights from the decrypted modified usage rights by performing an operation that is reverse of the homomorphic operation with the nonce.

In one implementation, the method further includes verifying that the extracted usage rights are same as the usage rights included in the license. In one implementation, the license includes the encrypted usage rights, hash usage rights, and a digital signature of a registering authority. In one implementation, the method further includes verifying the validity of the license by checking the validity of the digital signature of the registering authority.

In yet another implementation, a mobile device including an application for enforcing a license for content to be consumed according to conditions defined by usage rights stated in the license is disclosed. The mobile device includes: a first interface coupled with an agent; and a second interface coupled with a registering authority and configured to receive the usage rights for the content generated by the registering authority, wherein the application encrypts the usage rights with a key using a homomorphic encryption and sends the encrypted usage rights to the agent through the first interface, wherein the agent receives and performs a homomorphic operation on the encrypted usage rights with a nonce and sends modified encrypted usage rights back to the application through the first interface, wherein the application decrypts the modified encrypted usage rights and sends the decrypted modified usage rights back to the agent to verify the validity of the usage rights and the user by performing an operation that is reverse of the homomorphic operation with the nonce.

In one implementation, the validity of the usage rights is verified by: extracting usage rights from the decrypted modified usage rights; and verifying that the extracted usage rights are same as the usage rights included in the license. In one implementation, the application receives the content through a third interface to be consumed according to the usage rights when the validity of the usage rights is verified by the agent. In one implementation, the license is stored on a blockchain.

In yet another implementation, a non-transitory computer-readable storage medium storing a computer program to enforce a license for content to be consumed according to conditions defined by usage rights stated in the license is disclosed. The computer program includes executable instructions that cause a computer to: encrypt the usage rights with a key using a homomorphic encryption and sending the encrypted usage rights to an agent; receive from the agent modified encrypted usage rights generated by performing a homomorphic operation on the encrypted usage rights with a nonce; decrypt the modified encrypted usage rights and sending the decrypted modified usage rights back to the agent, wherein usage rights are extracted from the decrypted modified usage rights by performing an operation that is reverse of the homomorphic operation with the nonce.

In one implementation, the non-transitory computer-readable storage medium further includes executable instructions that cause the computer to verify that the extracted usage rights are same as the usage rights included in the license. In one implementation, the non-transitory computer-readable storage medium further includes executable instructions that cause the computer to receive the content to be consumed according to the usage rights when the verification is made. In one implementation, the content is received by an application installed on a mobile device owned by the user. In one implementation, the homomorphic encryption uses Advanced Encryption Standard Counter (AES-CTR) mode and exclusive OR (XOR) as the homomorphic operation.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the drawbacks exist for the DRM licenses being bound to a given device or set of devices. Certain implementations of the present disclosure provide for binding the license to its licensee rather than to the device, while still protecting the license. The DRM agent or authority do not share any secrets with the user but still authenticate the user and ensure that the license "belongs" to the user. This solution adds privacy to the blockchain because it does not disclose the portfolio of the licensed content.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1A:
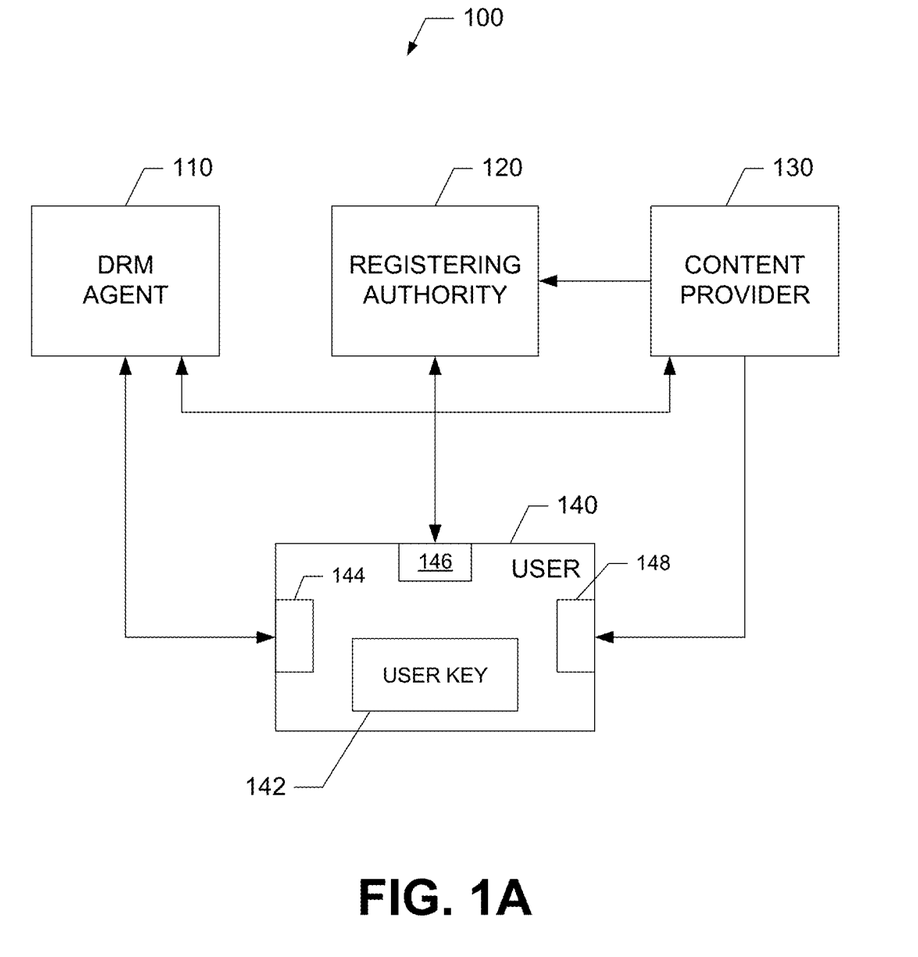
FIG. 1A is a block diagram of a system for distributing and enforcing a license for content (e.g., media) in accordance with one implementation of the present disclosure.

FIG. 1A is a block diagram of a system 100 for distributing and enforcing a license for content (e.g., media) in accordance with one implementation of the present disclosure. In the illustrated implementation of FIG. 1A, the license distribution system 100 includes a DRM agent 110, a registering authority 120, a content provider 130, and a user 140. In one implementation, the term "user" may refer to an application (e.g., an application on a mobile device of the user), user credentials, or persona of the user.

In one implementation, the user 140 purchases the content from the content provider 130 and plays the content through the DRM agent 110. The user 140 has a self-generated user key 142, which may be a secret symmetric key. In one implementation, the user is an application executing on a removable device such as a smart card or in the cloud. In another implementation, the user is an application executing on a mobile device. The content provider 130 is configured to provide the content to the user 140 to be consumed according to conditions defined by the usage rights stated in the license. In one implementation, consuming the content includes the user playing the content on the mobile device. The registering authority 120 is configured to generate the license for the content. The license carries a set of usage rights for a given user 140 and the hash of the usage rights. The DRM agent 110 receives the license and verifies whether the license is valid and the usage rights are properly fulfilled. If it is the case, the DRM agent 110 decrypts the content and provides the decrypted content to the user 140.

In one implementation, the user 140 receives the usage rights from the registering authority 120 and encrypts the usage rights with the user key 142 that is unique to the user. In one implementation, the usage rights are encrypted using a homomorphic encryption that allows computations to be carried out on an encrypted text, which matches the result of operations performed on the plaintext when decrypted. Thus, if encryption E is homomorphic with operator f, then, given two messages m and m', $D(E(m) f m')=m f m'$, where D represents decryption corresponding to encryption E.

In one implementation, the DRM agent 110 performs an homomorphic operation on the encrypted usage rights with a nonce (referred to as "obfuscation"), which is an arbitrary random or pseudo-random number used only once in a cryptographic communication. Thus, the homomorphic operation must be compatible with the chosen homomorphic encryption. The user 140 receives and decrypts the modified (or obfuscated) encrypted usage rights and returns the result to the DRM agent. The DRM agent 110 verifies whether the returned operation is correct. In this case, the user 140 can return the proper information only if the user 140 has the proper decryption key which was originally used to encrypt the usage rights.

In one implementation, in which the user 140 is implemented as an application on a mobile device, the mobile device includes: a first interface 144 which interfaces with the DRM agent 110; a second interface 146 which interfaces with the registering authority 120; and a third interface 148 which interfaces with the content provider 130. In one implementation, the second interface 146 is configured to receive the usage rights generated by the registering authority 120 and send the usage rights to the application which encrypts the usage rights with a key using a homomorphic encryption. The application sends the encrypted usage rights to the agent 110 through the first interface 144. The agent 110 receives and performs an operation on the encrypted usage rights with a nonce to generate and send an obfuscated encrypted usage rights back to the application through the first interface 144. The application then decrypts the obfuscated encrypted usage rights and sends the obfuscated decrypted usage rights back to the agent to verify the validity of the usage rights and the user. In one implementation, the decrypted content is received from the agent 110 through the first interface 144 once the agent 110 verifies the usage rights and the user as valid so that the content can be consumed by the application. In another implementation, the third interface is configured to receive the decrypted content from the content provider 130 when the agent 110 verifies the usage rights and the user as valid so that the content can be consumed by the application.

Figure 1B:
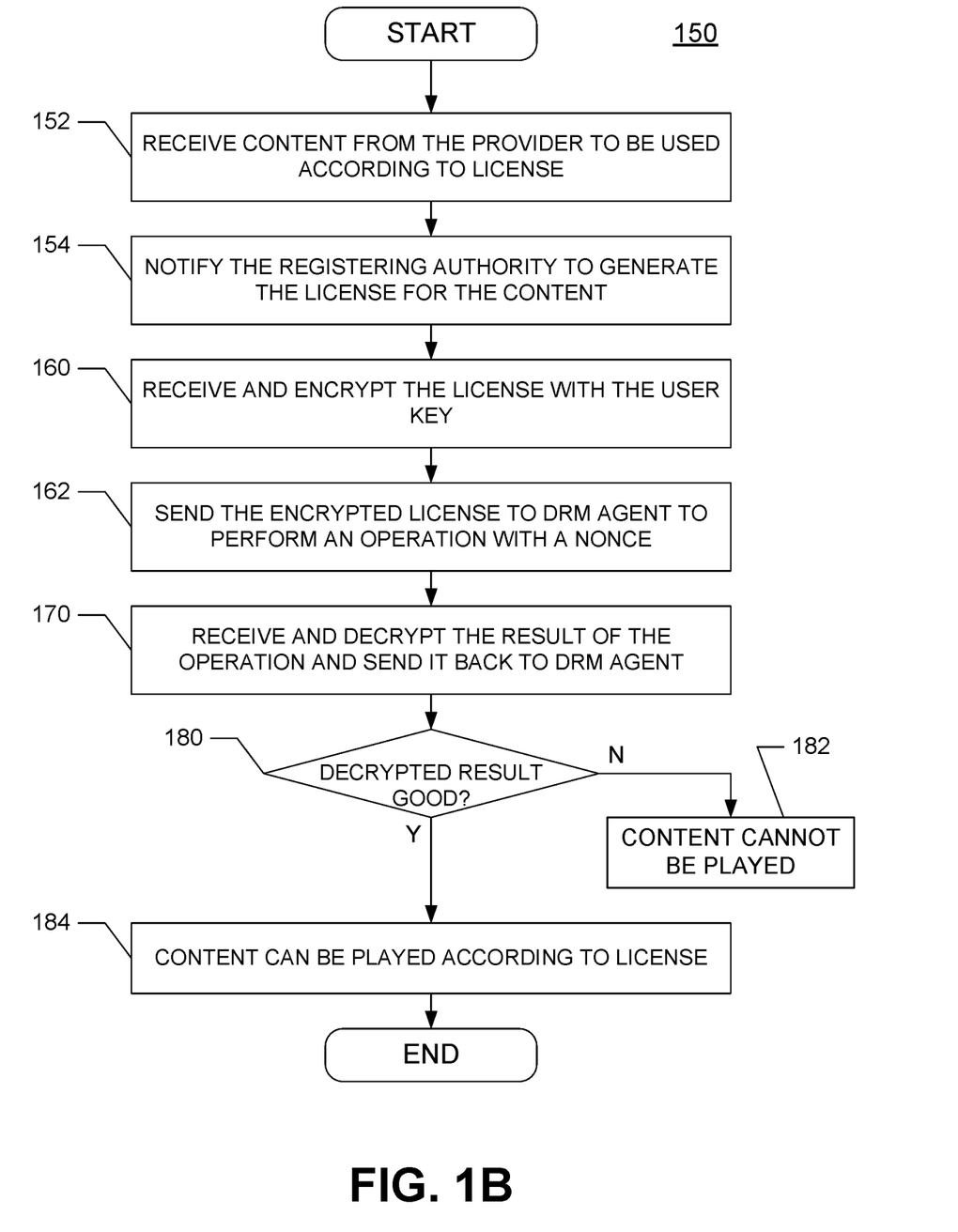
FIG. 1B is a flow diagram of a process for distributing and enforcing a license for the content (e.g., media) in accordance with one implementation of the present disclosure.

FIG. 1B is a flow diagram of a process 150 for distributing and enforcing a license for the content (e.g., media) in accordance with one implementation of the present disclosure. In the illustrated implementation of FIG. 1B, once the user 140 purchases the content from the content provider 130, the user 140 receives the content from the content provider 130, at step 152, to be consumed according to conditions defined by the usage rights stated in the license. The content provider 130 also notifies the registering authority 120, at step 154, to generate the license for the content. The license carries a set of usage rights for a given user 140. The usage rights are then sent from the registering authority 120 to the user 140 and the user 140 encrypts the usage rights with the user key 142 that is unique to the user, at step 160, and sends the encrypted usage rights to the DRM agent 110, at 162. In one implementation, the usage rights are encrypted using a homomorphic encryption that allows computations to be carried out on an encrypted text, which matches the result of operations performed on the plaintext when decrypted. Thus, if encryption E is homomorphic with operator $\int$, then, given two messages m and m', $D(E(m)\int m') = m\int m'$, where D represents decryption corresponding to encryption E.

In one implementation, the DRM agent 110 performs an operation on the encrypted usage rights with a nonce and the DRM agent 110 sends the result back to the user 140. The user 140 receives and decrypts the modified encrypted usage rights, at step 170, and returns the result back to the DRM agent 110. The DRM agent 110 verifies whether the returned operation is correct, at step 180. In this case, the user 140 can return the proper information only if the user 140 has the proper decryption key corresponding to the user key 142 used to originally encrypt the usage rights. Thus, if the returned operation is determined, at step 180, to be correct, the content can be played according to the usage rights, at step 184. Otherwise, if the returned operation is determined, at step 180, to be not correct, the content cannot be played, at step 182.

In one implementation, when the user 140 purchases the content from the content provider 130, the following operations are performed by the content provider 130 and the registering authority 120. The content provider 130 defines the usage rights, which include an identifier of the item of content and the licensed conditions of use of the content. The content provider 130 sends the usage rights to the registering authority 120 with a link to the user 140. The registering authority 120 requests the user 140 to encrypt the usage rights. The user 140 encrypts the usage rights with its user key 142 and returns the encrypted usage rights to the registering authority 120. In one implementation, the usage rights are encrypted using the homomorphic encryption. The registering authority 120 calculates the hash of the usage rights creating hash usage rights. In one implementation, the hashes are SHA-512 coded in base64.

In one implementation, the usage rights can be represented as follows:

Usage rights={Content ID,Licensed Rights}, where

Content ID uses the Entertainment Identifier Registry (EIDR),

Licensed Rights is a data structure listing the list of licensed audio languages and the list of licensed subtitles.

In one implementation, the DRM agent 110 uses a unique 128-bit DRM_KEY to encrypt the scrambling key CW. In one implementation, the Advanced Encryption Standard (AES) encryption is used. Thus, EncryptedCW=$AES_{\{DRm\_KEY\}}$ (CW). Further, the content can be expressed as follows:

Content={Content ID,Encrypted CW,Scrambled Essence}, where

Content ID is the EIDR code,

Encrypted CW is the AES encrypted CW,

Scrambled Essence is the essence (including all the available audio tracks and subtitle tracks) AES-encrypted with the CW.

In other implementations, the content provider 130 uses several DRM technologies, in which case, each supported DRM agent is identified by a DRM-ID. In this case, the content may also include a list of pairs DRM-ID and corresponding Encrypted CW. Further, each Encrypted CW is the CW encrypted by the secret DRM_KEY of the corresponding DRM agent.

In one implementation, when the user 140 purchases the content from the content provider 130, the content provider 130 registers the purchased version of the content in the EIDR global database and receives the Content ID. The content provider 130 also generates a random 128-bit number that is the CW. Further, the content provider 130 calculates the corresponding Encrypted CW by encrypting the CW with the corresponding DRM_KEY. The content provider 130 scrambles the clear essence with CW to generate the Scrambled Essence. In one implementation, the scrambling uses AES in CTR mode. The content provider 130 packages all these information into the content. The content can then be freely distributed as it is self-protected.

Figure 2:
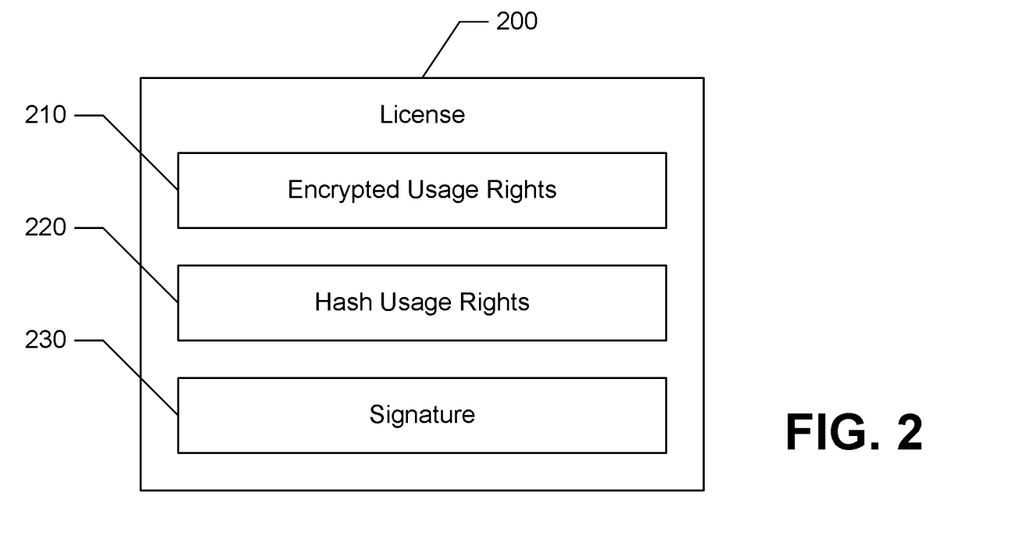
FIG. 2 is a block diagram of a license generated by the registering authority in accordance with one implementation of the present disclosure.

FIG. 2 is a block diagram of a license 200 generated by the registering authority in accordance with one implementation of the present disclosure. In the illustrated implementation of FIG. 2, the license 200 includes encrypted usage rights 210, hash usage rights 220, and signature 230. In one implementation, the signature 230 is the digital signature by registering authority of the encrypted usage rights 210 and the hash usage rights 220. In one implementation, the registering authority 120 then provides the license 200 to the user. In another implementation, the license is stored on a blockchain.

In one implementation, prior to the user 140 playing the item of content, the DRM agent 110 receives and verifies three conditions about the provided license 200. Firstly, the DRM agent 110 verifies that a known legitimate authority issued the license by checking the validity of the signature 230 and that it was signed by the registering authority 120. Secondly, the DRM agent 110 checks to make sure that the owner of the license (i.e., the user) was able to decrypt the usage rights of the license by performing the following: (1) generates a nonce (Agent_nonce); (2) calculates ObfuscatedEncryptedUsage Rights=f(Agent_nonce, EncrytedUsageRights); (3) sends ObfuscatedEncryptedUsageRights to the user 140 to decrypt it using the user key 142; (4) receives the result, Obfuscated DecryptedUsageRights, back from the user 140; (5) calculates DecryptedUsageRights=$f^{-1}$(Agent_nonce, ObfuscatedDecryptedUsage Rights); and (6) calculates the hash of DecryptedUsageRights to verify that it is equal to the hash usage rights 220. Regarding (3), since the encryption is homomorphic for operation f, the result should be the original usage rights. Further, since a nonce was used to protect the transferred DecryptedUsageRights, the proof exists that the user 140 had the user key 142 in possession. This also ensures that an attacker could not create a dictionary attack. Thirdly, the DRM agent 110 checks that the usage rights are valid, i.e., the conditions are fulfilled. Accordingly, once the three conditions stated above are met, the DRM agent 110 proceeds to decrypt the content.

In one particular implementation, the homomorphic encryption uses Advanced Encryption Standard Counter (AES-CTR) mode for the operation XOR, noted as ⊕. Thus, the operation is described as follows:

$$D_{\{K,IV\}}(E_{\{K,IV\}}(m) \oplus R) = m \oplus R, \text{ where}$$

$E_{\{K,IV\}}$ represents the AES encryption in CTR mode using key K and initial nonce or initialization vector (IV) with initial counter at 0, $D_{\{K,IV\}}$ represents the corresponding decryption.

The use of the AES-CTR mode means that the XOR function can be applied to the encrypted message.

Referring back to FIG. 1A, in one implementation, the user key 142 is a 128-bit random number unique to the user and is generated by the user 140. The user key 142 is only known to the user and is kept secret. In one particular implementation, the registering authority 120 uses a Rivest-Shamir-Adleman (RSA) 4096 public-private key pair ($K_{pub\_authority}$ and $K_{pri\_authority}$) for generating the signature. Key $K_{pub\_authority}$ is available to all users and DRM agents. In one particular, implementation, the registering authority 120 delivers (to the user 140) an RSA 2048 public-private key pair ($K_{pub\_user}$ and $K_{pri\_user}$) and the corresponding X509 certificate signed by the registering authority with $K_{pri\_authority}$.

Figure 3:
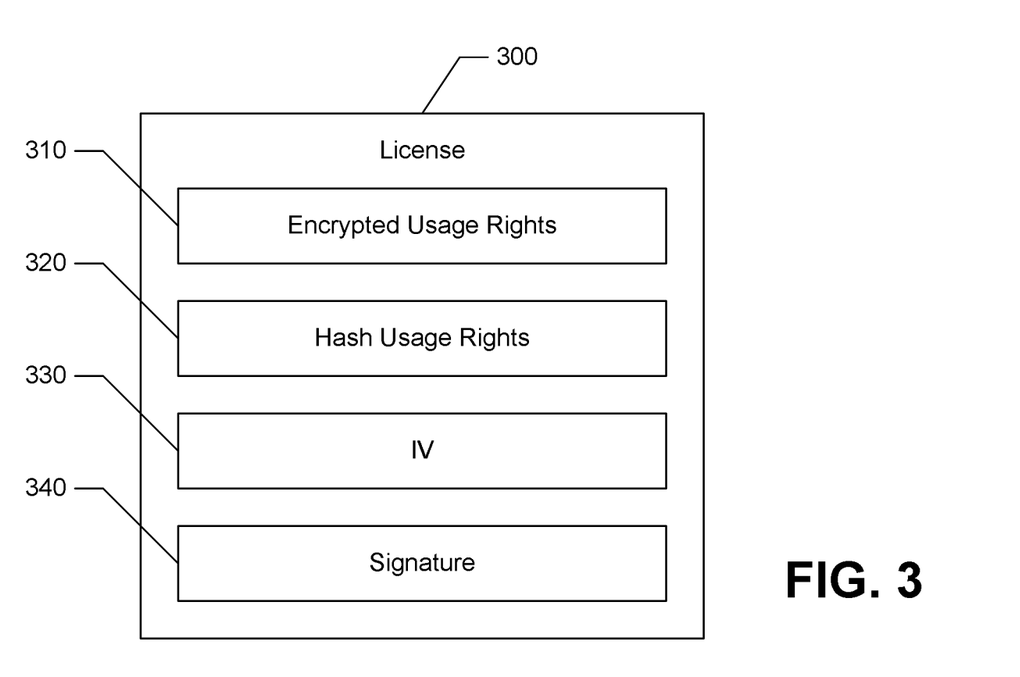
FIG. 3 is a block diagram of a license generated by the registering authority in accordance with another implementation of the present disclosure.

FIG. 3 is a block diagram of a license 300 generated by the registering authority in accordance with another implementation of the present disclosure. In the illustrated implementation of FIG. 3, the license 300 includes encrypted usage rights 310, hash usage rights 320, an initialization vector (IV) 330, and signature 340. In one implementation, the signature 340 is the digital signature by registering authority 120 of the encrypted usage rights 310, the hash usage rights 320, and the IV 330. In one implementation, the registering authority 120 then provides the license 200 to the user. In another implementation, the license is stored on a blockchain.

In another implementation, when the user purchases an item of content from the content provider, the following operations are performed by entities shown in FIG. 1A. The content provider 130 defines the usage rights (UsageRights). The usage rights list all the audio tracks and subtitles acquired by the user 140. The registering authority 120 calculates the hash of the usage rights to create HashUsageRights. In one implementation, HashUsageRights=SHA-512(UsageRights). The content provider 130 sends the usage rights to the registering authority 120 with a link to the user 140 and the user's public certificate, $K_{pub\_user}$. The registering authority 120 verifies the identity of the user 140 using a typical challenge response based on the public-private key pair ($K_{pub\_user}$ and $K_{pri\_user}$) it delivered to the user 140. The registering authority 120 requests the user 140 to encrypt the usage rights by sending the usage rights securely to the user 140. The user 140 encrypts the usage rights with the user key 142 by generating a 128-bit nonce IV. The user 140 calculates EncryptedUsageRights by encrypting UsageRights with the user key and IV 330 as EncryptedUsage Rights=$E_{\{UserKey,IV\}}$ (UsageRights). The user 140 then returns EncryptedUsageRights and IV to the registering authority 120, which builds the license including the elements described above.

Figure 4A:
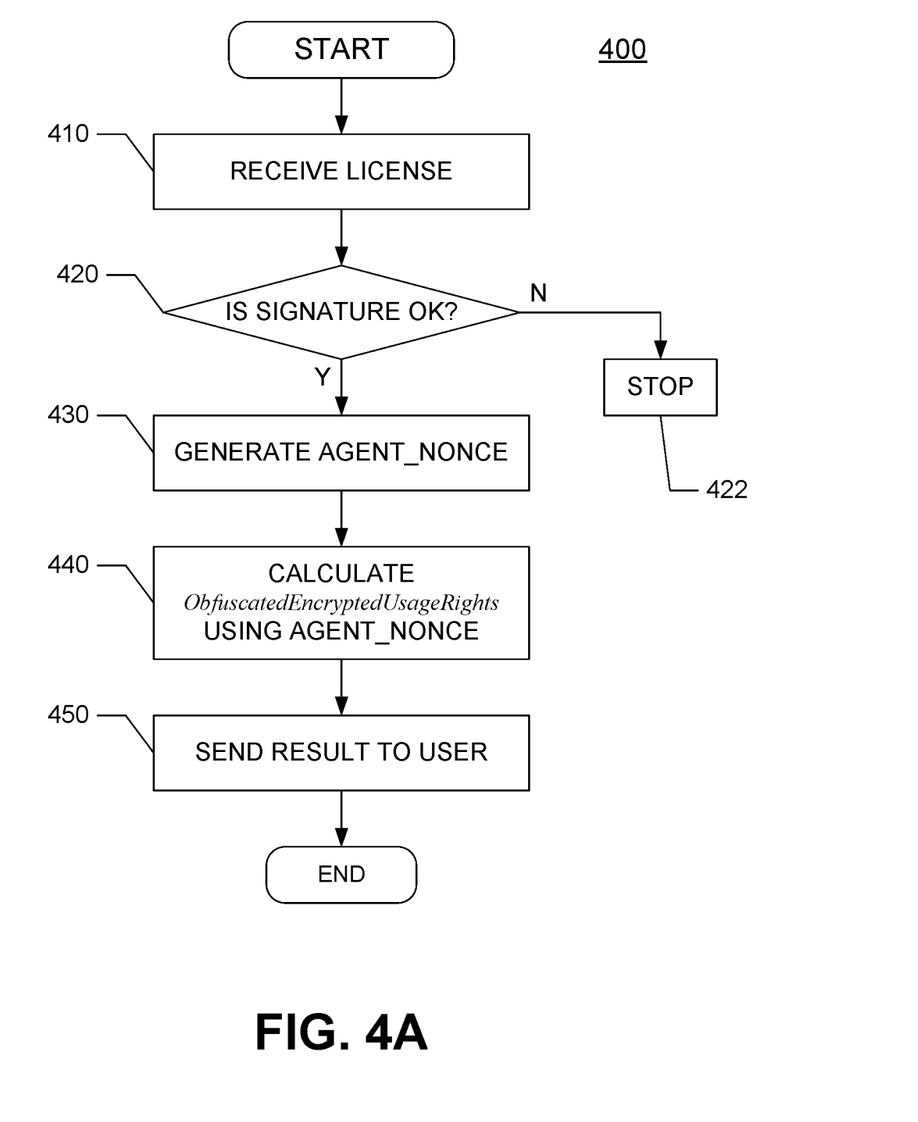
FIG. 4A is a flow diagram illustrating a process for generating obfuscated encrypted usage rights by the agent in accordance with one implementation of the present disclosure.

FIG. 4A is a flow diagram illustrating a process 400 for generating obfuscated encrypted usage rights by the agent in accordance with one implementation of the present disclosure. Thus, in the illustrated implementation of FIG. 4A, prior to the user 140 playing the item of content, the DRM agent 110 receives and verifies the validity of the license 300, at step 410, by checking the validity of the signature 340, at step 420, using the stored $K_{pub\_authority}$. If the validity of the signature cannot be verified, at step 420, the process 400 stops at step 422. Otherwise, if the validity of the signature is verified, at step 420, the DRM agent 110 next generates a nonce (i.e., Agent_nonce) of the size of EncryptedUsageRights (i.e., usage rights encrypted by the user using its own key), at step 430, and calculates Obfuscated EncryptedUsageRights=EncryptedUsageRights⊕Agent_nonce, at step 440. The result (i.e., ObfuscatedEncryptedUsageRights), along with IV 330, is sent to the user 140, at step 450.

Figure 4B:
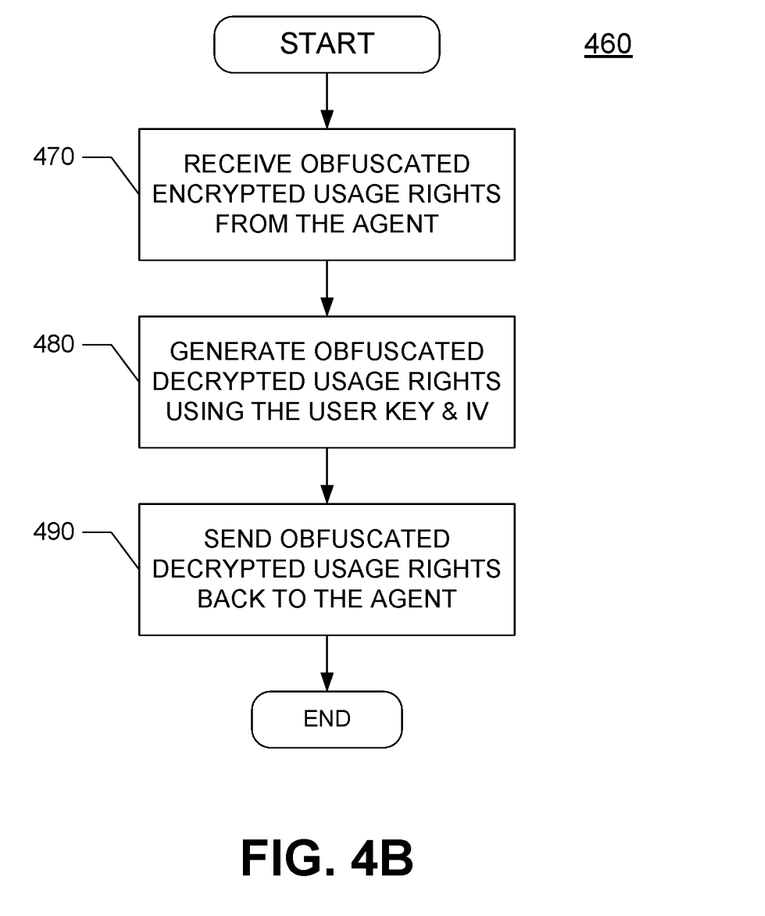
FIG. 4B is a flow diagram illustrating a process for receiving the obfuscated encrypted usage rights and generating the obfuscated decrypted usage rights by the user in accordance with one implementation of the present disclosure.

FIG. 4B is a flow diagram illustrating a process 460 for receiving the obfuscated encrypted usage rights and generating the obfuscated decrypted usage rights by the user in accordance with one implementation of the present disclosure. In the illustrated implementation of FIG. 4B, the obfuscated encrypted usage rights are received from the agent, at step 470. The obfuscated decrypted usage rights are then generated, at step 480, by decrypting the obfuscated encrypted usage rights using the user key 142 and IV 330. ObfuscatedDecryptedUsage Rights=$D_{\{UserKey,IV\}}$(Obfuscated EncryptedUsageRights). The result is sent back to the agent, at step 490.

Figure 5:
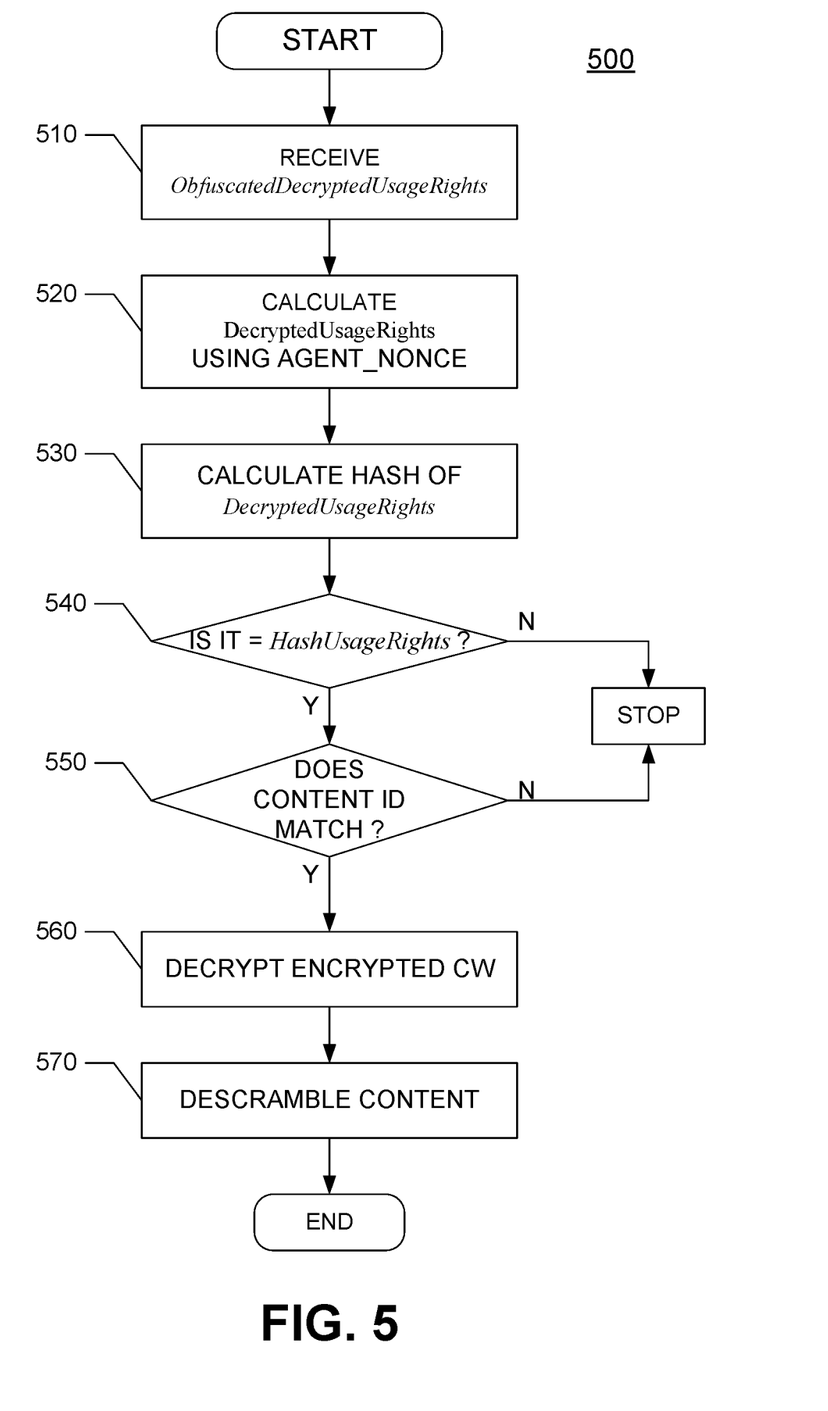
FIG. 5 is a flow diagram illustrating a process for receiving the usage rights and generating the descrambled content in accordance with one implementation of the present disclosure.

FIG. 5 is a flow diagram illustrating a process 500 for receiving the obfuscated decrypted usage rights and generating the descrambled content in accordance with one implementation of the present disclosure. Thus, in the illustrated implementation of FIG. 5, the agent 110 receives ObfuscatedDecryptedUsageRights, at step 510, and calculates, at step 520, DecryptedUsageRights=Agent_nonce⊕Obfuscated DecryptedUsageRights. The DRM agent 110 also calculates the hash of DecryptedUsageRights, at step 530, and verifies that it is equal to HashUsageRights (i.e., the hash of the usage rights in the license originally received from the registering authority 120; SHA 512 (DecryptedUsageRights)==HashUsageRights), at step 540. If the test, at step 540, is positive, the DRM agent 110 verifies whether the DecryptedUsage Rights is valid by verifying that the Content ID in Decrypted UsageRights matches the Content ID of the content, at step 550. If it is the case, the DRM agent 110 decrypts the Encrypted CW with its secret key DRM_KEY, at step 560, and retrieves the clear CW. The DRM agent 110 then descrambles the content with the CW, at step 570, and offers the languages and subtitles listed in DecryptedUsageRights. Otherwise, if the tests in steps 540 and/or 550 are negative, the process 500 stops.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for distributing and enforcing a license for content to be consumed according to conditions defined by usage rights included in the license, the method comprising:
   binding the license for the content to a user who is a licensee rather than a user device owned by the user by:
   selecting a homomorphic encryption at the user device that allows computations to be carried out on an encrypted text, which matches the result of operations performed on a plaintext when decrypted;
   encrypting, at the user device, the usage rights with a user key that is unique to the user who owns the user device using the homomorphic encryption and sending the encrypted usage rights to an agent,
   wherein the agent selects and performs a homomorphic operation, which is compatible with the homomorphic encryption as encrypted with the user key, on the encrypted usage rights with a nonce to produce modified encrypted usage rights such that the agent is able to authenticate the user without sharing any secrets with the user,
   wherein the nonce is a pseudo-random number used only once during communication between the user and the agent;
   receiving, at the user device, the modified encrypted usage rights from the agent;
   decrypting, at the user device, the modified encrypted usage rights to produce decrypted modified usage rights with the user key that is unique to the user and sending the decrypted modified usage rights back to the agent;
   calculating, at the agent, the usage rights from the decrypted modified usage rights by performing an operation that is reverse of the homomorphic operation with the nonce;
   verifying, at the agent, that the extracted usage rights for the user are same as the encrypted usage rights included in the license;
   calculating, at the agent, hashes of the extracted usage rights and verifying that the calculated hashes of the extracted usage rights are same as hash usage rights included in the license; and
   enabling the user to consume the content on any user device selected by the user.

2. The method of claim 1, further comprising
   receiving, at the user device, the content to be consumed according to the usage rights when the verification is made.

3. The method of claim 2, wherein the content is received by an application of a mobile device owned by the user.

4. The method of claim 1, further comprising
   self-generating, at the user device, the user key by the user.

5. The method of claim 1, wherein the homomorphic operation includes Advanced Encryption Standard Counter (AES-CTR) mode and exclusive OR (XOR).

6. A non-transitory computer-readable storage medium storing a computer program to enforce a license for content to be consumed according to conditions defined by usage rights included in the license, the computer program comprising executable instructions that cause a computer to:
   bind the license for the content to a user who is a licensee rather than a user device owned by the user by causing the computer to:
   select a homomorphic encryption that allows computations to be carried out on an encrypted text, which matches the result of operations performed on a plaintext when decrypted;
   encrypt the usage rights with a user key that is unique to the user who owns the user device using the homomorphic encryption and sending the encrypted usage rights to an agent such that the agent is able to authenticate the user without sharing any secrets with the user, wherein the agent selects and performs a homomorphic operation, which is compatible with the homomorphic encryption as encrypted with the user key, on the encrypted usage rights with a nonce to produce modified encrypted usage rights, wherein the nonce is a pseudo-random number used only once during communication between the user and the agent;

receive from the agent modified encrypted usage rights;

decrypt the modified encrypted usage rights to produce decrypted modified usage rights with the user key that is unique to the user and send the decrypted modified usage rights back to the agent;

calculate the usage rights from the decrypted modified usage rights by performing an operation that is reverse of the homomorphic operation with the nonce;

verify that the extracted usage rights for the user are same as the encrypted usage rights included in the license;

calculate hashes of the extracted usage rights and verify that the calculated hashes of the extracted usage rights are same as hash usage rights included in the license; and enable the user to consume the content on any user device selected by the user.

7. The non-transitory computer-readable storage medium of claim 6, further comprising executable instructions that cause the computer to receive the content to be consumed according to the usage rights when the verification is made.

8. The non-transitory computer-readable storage medium of claim 6, wherein the homomorphic operation includes Advanced Encryption Standard Counter (AES-CTR) mode and exclusive OR (XOR).

* * * * *